United States Patent
Dowty

(10) Patent No.: US 12,290,480 B2
(45) Date of Patent: May 6, 2025

(54) AFT ROW CLOSET WITH WHEELCHAIR ACCOMMODATION AND BASSINET MOUNT

(71) Applicant: B/E Aerospace, Inc., Winston-Salem, NC (US)

(72) Inventor: Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 15 days.

(21) Appl. No.: 18/118,545

(22) Filed: Mar. 7, 2023

(65) Prior Publication Data

US 2024/0299222 A1  Sep. 12, 2024

(51) Int. Cl.
*A61G 3/08* (2006.01)
*B64D 11/06* (2006.01)

(52) U.S. Cl.
CPC ............ *A61G 3/0808* (2013.01); *B64D 11/06* (2013.01)

(58) Field of Classification Search
CPC .... A61G 3/0808; B64D 11/06; B64D 11/003; B64D 11/0627
See application file for complete search history.

(56) References Cited

U.S. PATENT DOCUMENTS

| | | | |
|---|---|---|---|
| 8,770,517 B2 | 7/2014 | Boren et al. | |
| 9,725,174 B2 | 8/2017 | Seibt et al. | |
| 10,214,290 B2 * | 2/2019 | Ehlers | B64D 11/003 |
| 10,752,358 B2 * | 8/2020 | Hills | D06F 58/10 |
| 10,919,631 B2 | 2/2021 | Scoley et al. | |
| 2012/0048998 A1 | 3/2012 | Schliwa et al. | |
| 2013/0206905 A1 * | 8/2013 | Savian | B64D 11/04 29/428 |
| 2014/0298582 A1 * | 10/2014 | Kircher | B63B 29/20 5/9.1 |
| 2014/0339364 A1 * | 11/2014 | Ehlers | B64D 11/0691 244/118.6 |

(Continued)

FOREIGN PATENT DOCUMENTS

| | | |
|---|---|---|
| EP | 3848285 A1 | 7/2021 |
| EP | 3885262 A1 | 9/2021 |

OTHER PUBLICATIONS

European Patent Office, Extended European Search Report received in EP Application No. 24158466.3, Jun. 18, 2024, 9 pages.

*Primary Examiner* — Philip J Bonzell
*Assistant Examiner* — Cindi M Curry
(74) *Attorney, Agent, or Firm* — Suiter Swantz IP

(57) ABSTRACT

A layout for a tapering rear section of an aircraft passenger cabin. The layout includes a seat row positioned between an aisle and an exterior wall, and a closet positioned behind the seat row. A first portion of the closet extends behind the seat row and a second portion of the closet extends into gap space formed between an outboard side of the seat row and the exterior wall. The closet forms interior space dimensioned, for example, to accommodate a folded wheelchair positioned along the exterior wall, as well as interior space behind the seat row. The second portion further forms an exterior surface for use by a passenger in the seat row, for instance a horizontal surface including a provision for mounting a bassinet. The interior space is accessible from the rear facing side of the closet to facilitate stowing and retrieving items from the interior space.

17 Claims, 5 Drawing Sheets

(56) References Cited

U.S. PATENT DOCUMENTS

| | | | |
|---|---|---|---|
| 2015/0367942 A1* | 12/2015 | Parry | B64D 11/0007 |
| | | | 244/118.5 |
| 2016/0101866 A1* | 4/2016 | Sieben | B64D 11/04 |
| | | | 244/118.5 |
| 2017/0106983 A1 | 4/2017 | Castanos et al. | |
| 2017/0259921 A1* | 9/2017 | Valdes De La Garza | |
| | | | B64D 11/0638 |
| 2017/0283066 A1* | 10/2017 | Heidtmann | B64D 11/0636 |
| 2021/0214087 A1* | 7/2021 | Moe | B64D 11/0646 |
| 2022/0212774 A1* | 7/2022 | Eisele | E04H 1/1266 |
| 2022/0240690 A1* | 8/2022 | Esquerra Milchorena | |
| | | | B60N 2/2854 |
| 2022/0306298 A1* | 9/2022 | Schmidt-Schäffer | |
| | | | B64D 11/0601 |
| 2022/0332421 A1 | 10/2022 | Dowty et al. | |
| 2022/0388664 A1 | 12/2022 | Nicolato et al. | |
| 2023/0249829 A1* | 8/2023 | Nicolato | B64D 11/00 |
| | | | 244/118.5 |
| 2024/0327003 A1* | 10/2024 | Glain | B64D 11/0606 |

\* cited by examiner

AFT ROW CLOSET WITH WHEELCHAIR ACCOMMODATION AND BASSINET MOUNT

TECHNICAL FIELD AND BACKGROUND

The present disclosure relates generally to stowage solutions for aircraft cabins, and more particularly, to a closet configured for installation in a tapering rear section of an aircraft passenger cabin, the closet providing wheelchair access and passenger accessory provisions on opposite facing sides of the closet.

Commercial airliners typically include overhead bins and small closets for stowing items in the cabin. While the former is typically reserved for carryon bags and personal items, the latter can be used to stow items such as musical instruments on a first come, first served basis.

Large items incapable of fitting in a small closet, such as a standard wheelchair, must be stowed in the aircraft baggage compartment. Stowing a wheelchair outside of the cabin can be disruptive to the restricted mobility passenger as well as delay the embarking and disembarking processes.

Therefore, it would be desirable to provide a cabin stowage solution for wheelchairs and other large items to avoid disruptions and delays, and without having to decrease the number of revenue-generating passenger seats.

BRIEF SUMMARY

To achieve the foregoing and other advantages, according to a first aspect, the present disclosure provides a closet configured to be positioned behind a seat row in a tapering rear section of an aircraft passenger cabin formed between an exterior wall and a longitudinal aisle. The closet includes a first portion configured to extend behind the seat row from the exterior wall to the longitudinal aisle, and a second portion configured to extend in a gap space formed between the exterior wall and an outboard side of the seat row. The first portion and the second portion together form an interior space dimensioned, for example, to accommodate a wheelchair in a folded condition positioned along the exterior wall. The interior space is accessible from a rear facing side of the first portion of the closet. The second portion supports a passenger accessory positioned outside of the interior space, the passenger accessory accessible from the seat row.

In some embodiments, the closet includes at least one first door for accessing the interior space from the rear facing side of the first portion of the closet, and at least one second door for accessing the interior space from the longitudinal aisle.

In some embodiments, the first portion extends in height from about floor to ceiling, and the second portion extends in height from about the floor to about armrest height of the seat row.

In some embodiments, a top of the second portion of the closet forms a substantially horizontal surface positioned along the outboard side of the seat row.

In some embodiments, the horizontal support surface includes a provision for mounting a bassinet atop the horizontal surface.

In some embodiments, the closet is substantially L-shaped.

In some embodiments, the interior space is not accessible from the seat row.

In some embodiments, the seat row includes one less seat than a further seat row positioned directly forward of the seat row.

In some embodiments, the seat row includes two laterally adjacent seats.

According to a further aspect, the present disclosure provides a layout for a tapering rear section of an aircraft passenger cabin. The layout includes a longitudinal aisle, a first seat row positioned between the longitudinal aisle and an exterior wall of the aircraft passenger cabin, a gap space formed between an outboard side of the first seat row and the exterior wall, and a closet positioned behind the first seat row. The closet includes a first portion positioned behind a rear facing side of the first seat row and a second portion, continuous with the first portion, positioned in the gap space. The first portion and the second portion together form an interior space dimensioned to, for example, accommodate a wheelchair in a folded condition positioned along the exterior wall. The interior space is accessible from a rear facing side of the first portion of the closet. The second portion supports a passenger accessory positioned outside of the interior space and accessible from the first seat row.

In some embodiments, the layout further includes a second seat row positioned between the longitudinal aisle and the exterior wall, forward of the first seat row, and longitudinally adjacent to the first seat row, wherein the second seat row includes a greater number of seats as compared to the first seat row.

In some embodiments, the first closet portion extends in height from about floor to ceiling, and the second closet portion extends in height from about the floor to about armrest height of the first seat row.

In some embodiments, a top of the second portion of the closet forms a substantially horizontal surface positioned along the outboard side of the first seat row, and the horizontal surface includes a provision for mounting a bassinet.

In some embodiments, the closet is further accessible from the longitudinal aisle.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
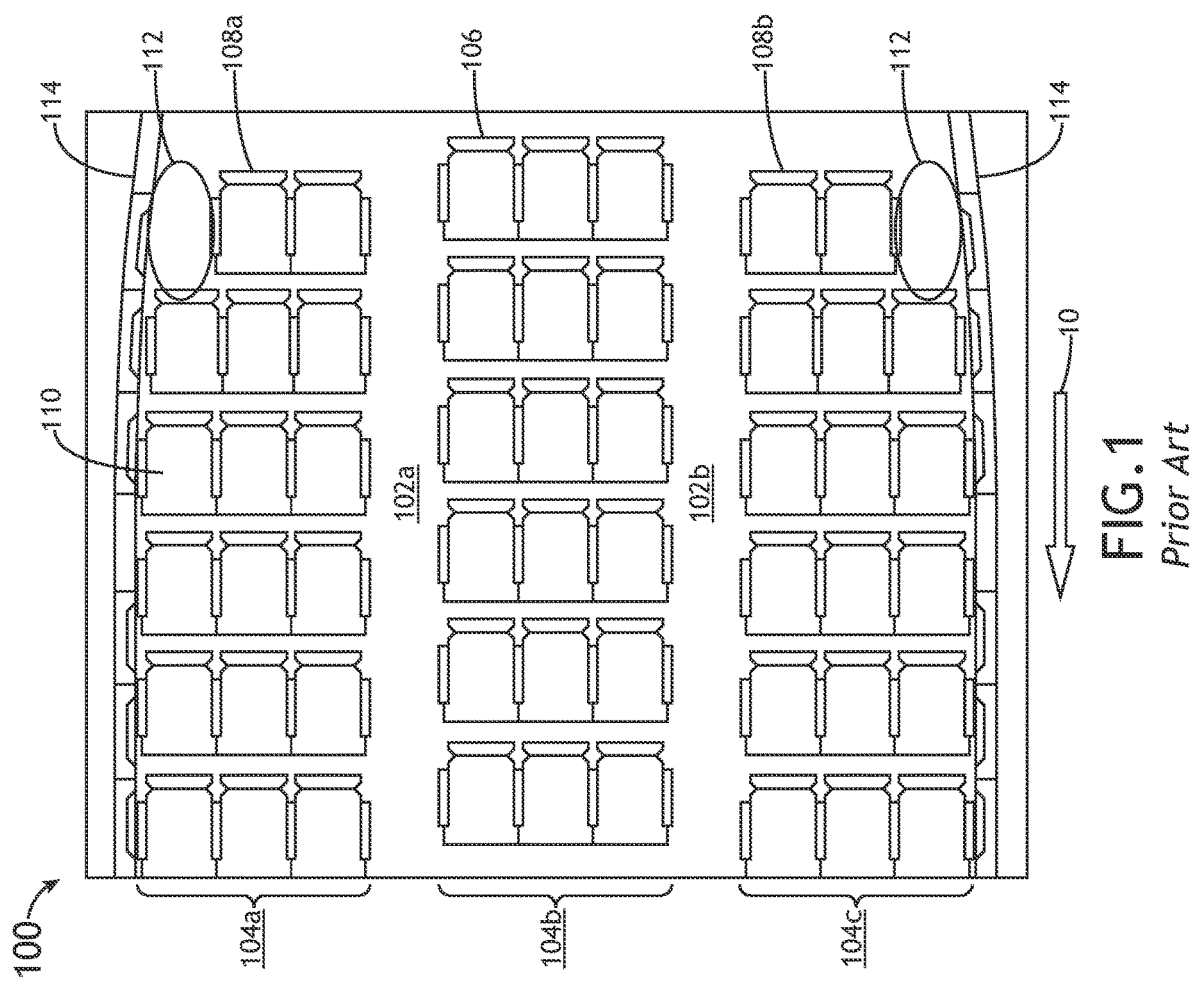
FIG. 1 is a plan view of a tapering rear section of an aircraft passenger cabin according to the prior art, showing gap space formed between an exterior wall and an outboard side of an aft seat row.

Before explaining embodiments of the inventive concepts disclosed herein in detail, it is to be understood that the inventive concepts disclosed herein are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, where applicable, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Broadly, the present disclosure provides closet configurations and cabin layouts including closet configurations for accommodating large items, such as a wheelchair in a folded condition. As used herein, closet refers to any enclosure, cabinet, monument, or other furniture typically used for the purpose of stowing items in a cabin, for instance an aircraft passenger cabin. Preferably, but not necessarily, a wheelchair according to the present disclosure means a standard sized wheelchair and not an undersized transfer wheelchair. In some embodiments, the wheelchair may be a standard sized or specialized wheelchair having a width or other dimension that makes the wheelchair incapable of traversing a conventional longitudinal aisle width. As used herein, a passenger of restricted mobility means a passenger that requires and/or benefits from the full-time or part-time use of a wheelchair. A wheelchair according to the present disclosure may be specialized in order to accommodate specific needs of a passenger.

Regarding implementation, a closet according to the present disclosure may be positioned proximate an exterior door of the cabin, such as a door for entering and exiting an aircraft. As used herein, aisle means any passageway in the cabin. The passenger cabin may include at least one longitudinal aisle arranged substantially parallel to the aircraft longitudinal aisle. Branch or transverse aisles may extend from the longitudinal aisle. For example, a branch aisle may be arranged perpendicular to a longitudinal aisle providing a passageway between an exit door and a longitudinal aisle. A closet may be positioned along a branch aisle such as to one side of a branch aisle such that the closet is directly accessible from the branch aisle.

The flight direction of the aircraft is indicated in the drawing figures by the directional arrow 10 to provide meaning and context for forward and aft descriptions as used herein. For example, forward as used herein may mean generally facing the direction of flight. As used herein, forward may also mean a position closer to a front of the aircraft as compared to a referenced object. Vice versa, as used herein, aft may mean generally facing opposite the direction of flight as well as closer to a back of the aircraft as compared to a referenced object. In addition, as used herein, aft may be synonymous with behind to define a positional relationship between referenced objects.

FIG. 1 illustrates a non-limiting example of an aircraft cabin 100 according to the prior art. The cabin 100 includes the rear section of the aircraft where the fuselage begins to taper inward. The cabin 100 shown is a widebody cabin including two longitudinal aisles 102a, 102b forming three seat columns 104a, 104b, 104c. Each seat column 104a, 104b, 104c includes seat rows 106 aligned to maintain a consistent longitudinal aisle width from front to back of the aircraft. Each seat row 106, with the exception of the aftmost outboard seat rows 108a, 108b, includes three laterally adjacent seats 110. The aftmost outboard seat rows 108a, 108b include one less seat 110 per row considering the narrowed cabin width and desire to maintain a consistent longitudinal aisle width. The removal of one seat 110 per aft row 108a, 108b results in a gap space 112 being formed between an outboard side of the aft seat row 108a, 108b and the exterior wall 114 of the aircraft. While the length and width dimensions of the gap space 112 may vary depending on the dimensions of the seat row, seat row spacing relative to the exterior wall, seat pitch, degree of taper, etc., the dimensions are insufficient to accommodate another seat 110.

While an exemplary cabin 100 is shown in FIG. 1, other cabin layouts may form a similar gap space 112 outboard of the aft rows regardless of the number of longitudinal aisles, number of seat columns, number of seats per row, etc. As the present disclosure is concerned, an aft seat row is one that includes a lesser number of seats as compared to a seat row immediately forward of the aft seat row. For example, one seat versus two seats, two seats versus three seats, three seats versus four seats, n seats versus n+1 seats. The inboard seat of each of the aft seat row and the forward seat row are preferably longitudinally aligned to maintain a consistent longitudinal aisle width.

Figure 2:
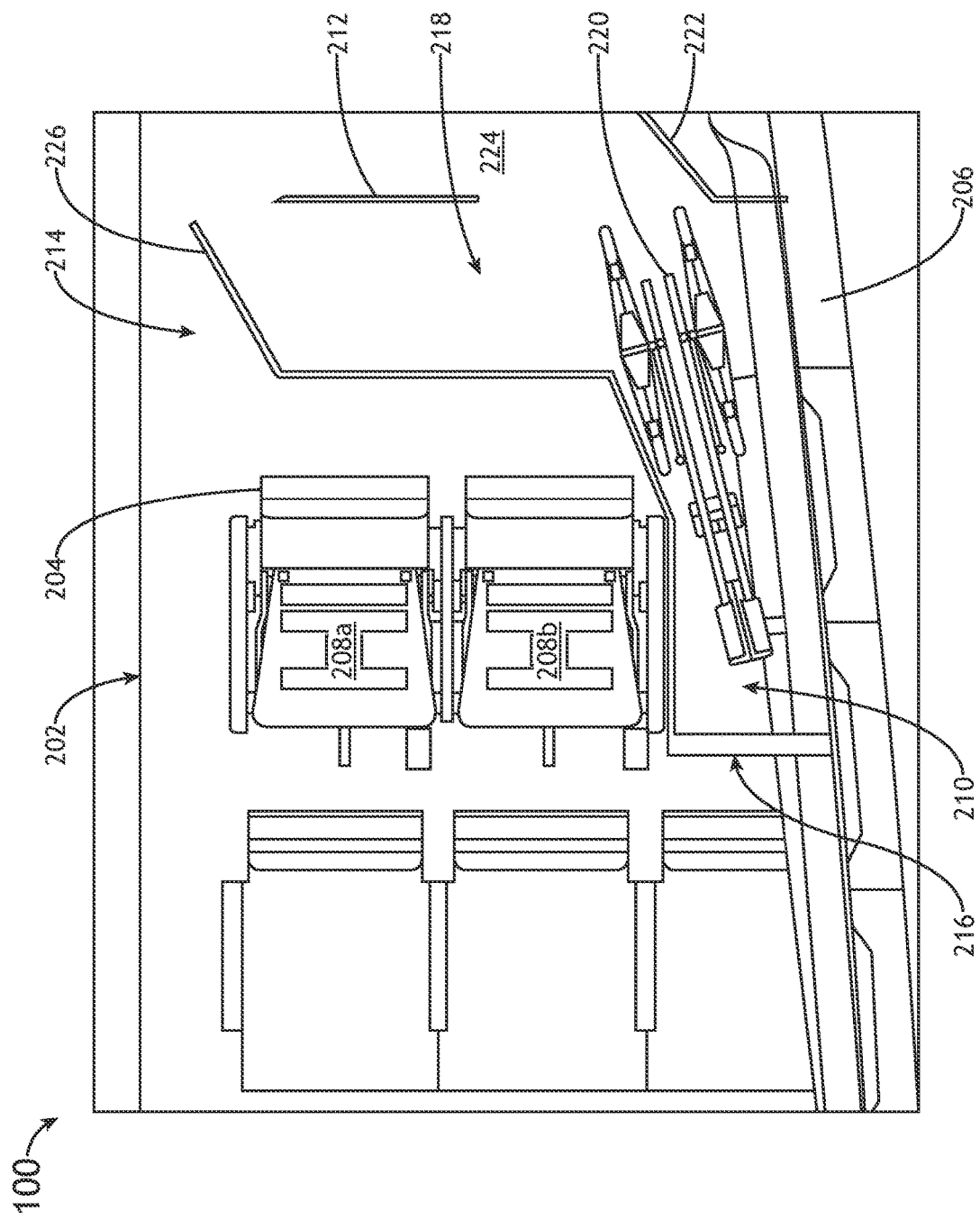
FIG. 2 is a plan view of a layout for a tapering rear section of an aircraft passenger cabin in accordance with at least one embodiment of the present disclosure, showing a closet including a forward extending portion configured to utilize the gap space to accommodate a folded wheelchair along the exterior wall.

FIG. 2 illustrates an embodiment of a portion of a cabin layout 200 according to the present disclosure. The cabin layout 200 is particularly suited for a tapering rear section of an aircraft passenger cabin. The cabin layout includes a longitudinal aisle 202 such as an aisle extending from front to back of an aircraft and parallel to an aircraft longitudinal axis. A first seat row 204, implemented as an aft seat row, is positioned between the longitudinal aisle 202 and the exterior wall 206 of the aircraft. The first seat row 204 is positioned at a longitudinal position along the length of the aircraft at which the aircraft fuselage tapers inward. As shown, the first seat row 204 includes an inboard seat 208a positioned adjacent the longitudinal aisle 202 and an outboard seat 208b positioned apart from the longitudinal aisle 202. In some embodiments, the seats 208a, 208b are aligned side-by-side. In some embodiments, the seats 208a, 208b may be economy class seats wherein at least some seat frame elements are shared. In other embodiments, the seats 208a, 208b may be entirely separate.

The outboard seat 208b is positioned spaced apart from the exterior wall 206 such that a gap space 210 is formed between the outboard seat 208b and the exterior wall 206. In some embodiments, the gap space 210 extends along the side of the outboard seat 208b to the back of a seat in the seat row immediately forward, and a height from floor to ceiling.

The cabin layout 200 further includes a closet 212 for stowing items in the cabin. The closet 212 includes a first portion 214 positioned behind a rear facing side of the first seat row 204 and a second portion 216, continuous with the first portion 214, positioned in the gap space 210. The first portion 214 includes a first side facing away from the first seat row 204 (i.e., aft facing side), a second side facing toward the first seat row 204 (i.e., forward facing side), a third side facing the longitudinal aisle 202, and a fourth side facing the exterior wall 206. In some embodiments, the second portion 216 extends forward from the second side to a position aligned with or forward of a front edge of the first seat row 204.

The first portion 214 and the second portion 216 together form an interior space 218, which may or may not be further subdivided into separate compartments. A portion of the interior space 218 positioned along the exterior wall 206 is dimensioned large enough to accommodate a standard sized wheelchair 220 in a folded condition. As shown, part of the wheelchair 220 is positioned in the interior space 218 formed within the first portion 214 and another part of the wheelchair 220 is positioned in the interior space formed within the second portion 216. In some embodiments, the ceiling height in the first portion 214 is greater than the ceiling height in the second portion 216 such that the wheelchair faces forward when stowed.

The first portion 214 includes at least one door for accessing the interior space 218 and/or for entering the interior space 218. In some embodiments, a first door 222 provides access to the interior space 218 from a transverse aisle 224 and a second door 226 provides access to the interior space 218 from the longitudinal aisle 202. As mentioned above, the interior space 218 may include separate compartments enterable from different doors. As shown, the wheelchair 220 is accessible through the door 222 positioned on the rear facing side of the first portion 214 of the closet 212. The closet 212 further serves to provide privacy along the backside of the first seat row 204.

Figure 3:
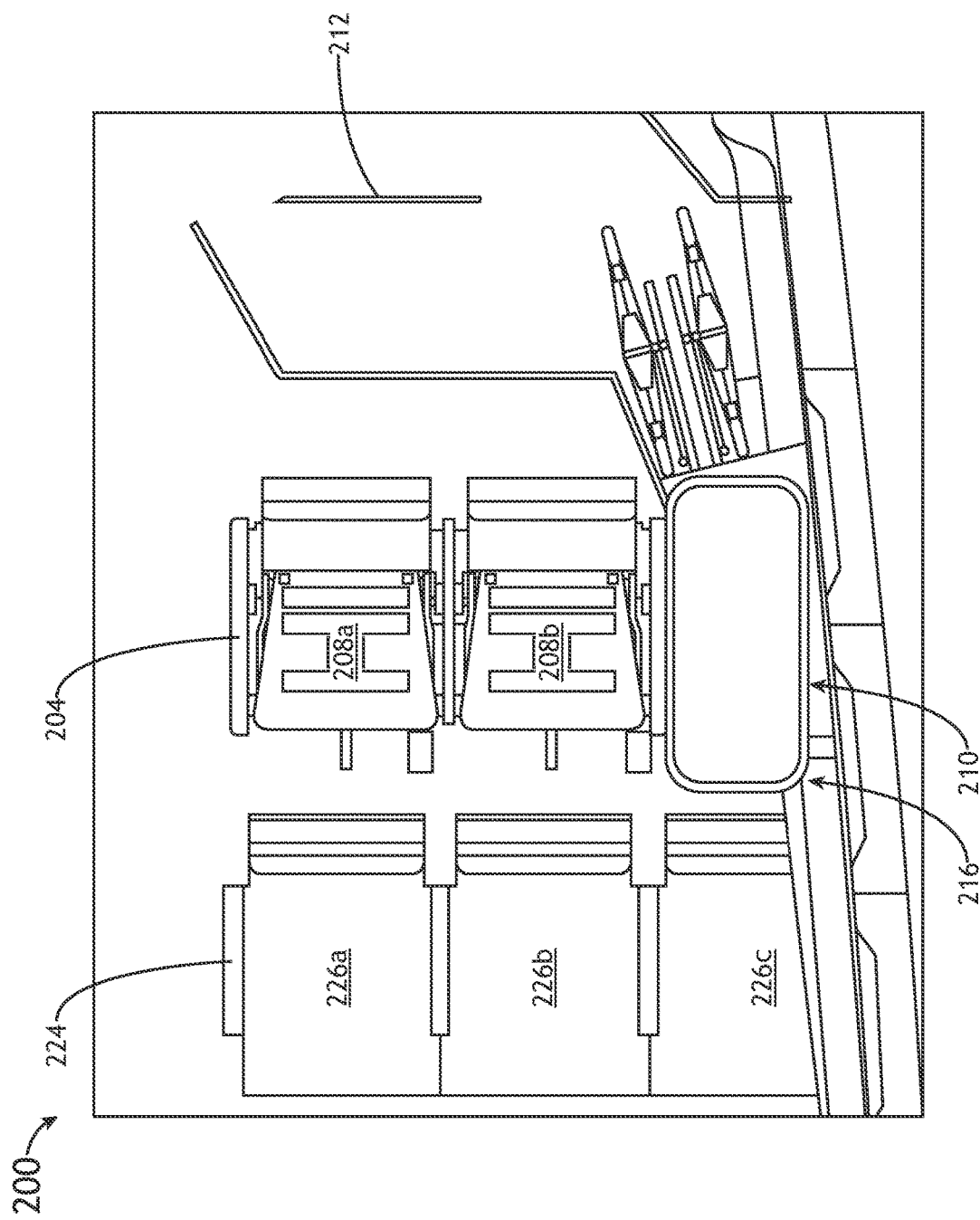
FIG. 3 is a plan view of a layout for a tapering rear section of an aircraft passenger cabin in accordance with at least one embodiment of the present disclosure, showing a provision for mounting a bassinet accessible from the seat row.

FIG. 3 illustrates a passenger accessory further provided by the closet 212. In some embodiments, the first seat row 204 is positioned aft of a second seat row 224 such that the inboard seat 208a is positioned directly behind a like inboard seat 226a, the outboard seat 208b is positioned directly behind a like middle seat 226b, and the passenger accessory is positioned directly behind an outboard seat 226c of the second seat row 224. The passenger accessory is configured for use by a passenger in the first seat row 204, such as the passenger is the outboard seat 208b. As such, the closet 212 provides stowage space and a passenger accessory accessible from opposite facing sides of the closet 212. As shown, part of the wheelchair 220 is accommodated in the interior space positioned below the passenger accessory.

Figure 4:
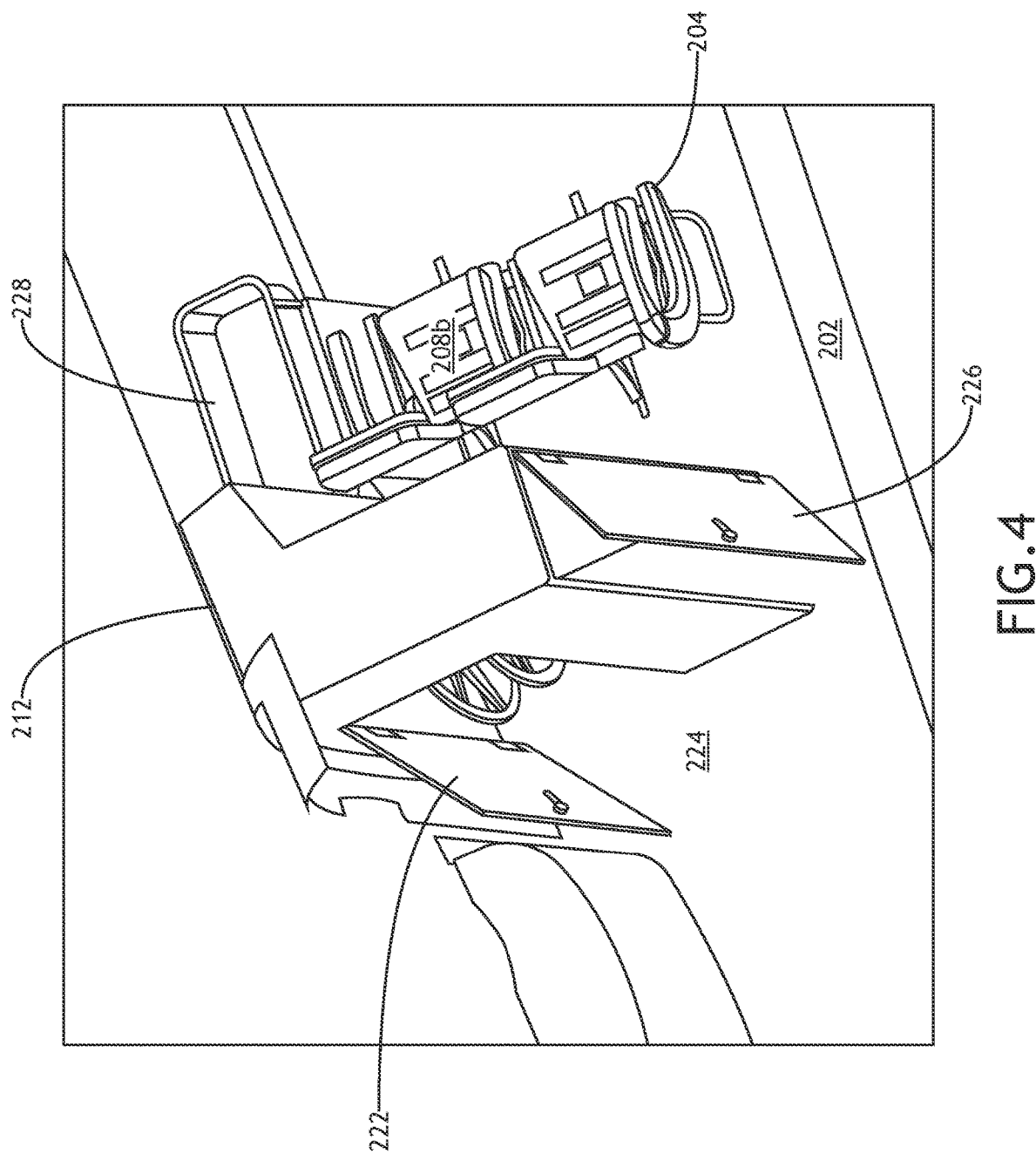
FIG. 4 is a rear perspective view of a layout for a tapering rear section of an aircraft passenger cabin in accordance with at least one embodiment of the present disclosure, showing interior closet space accessible from at least one or a rear facing side of the closet and a longitudinal aisle.
Figure 5:
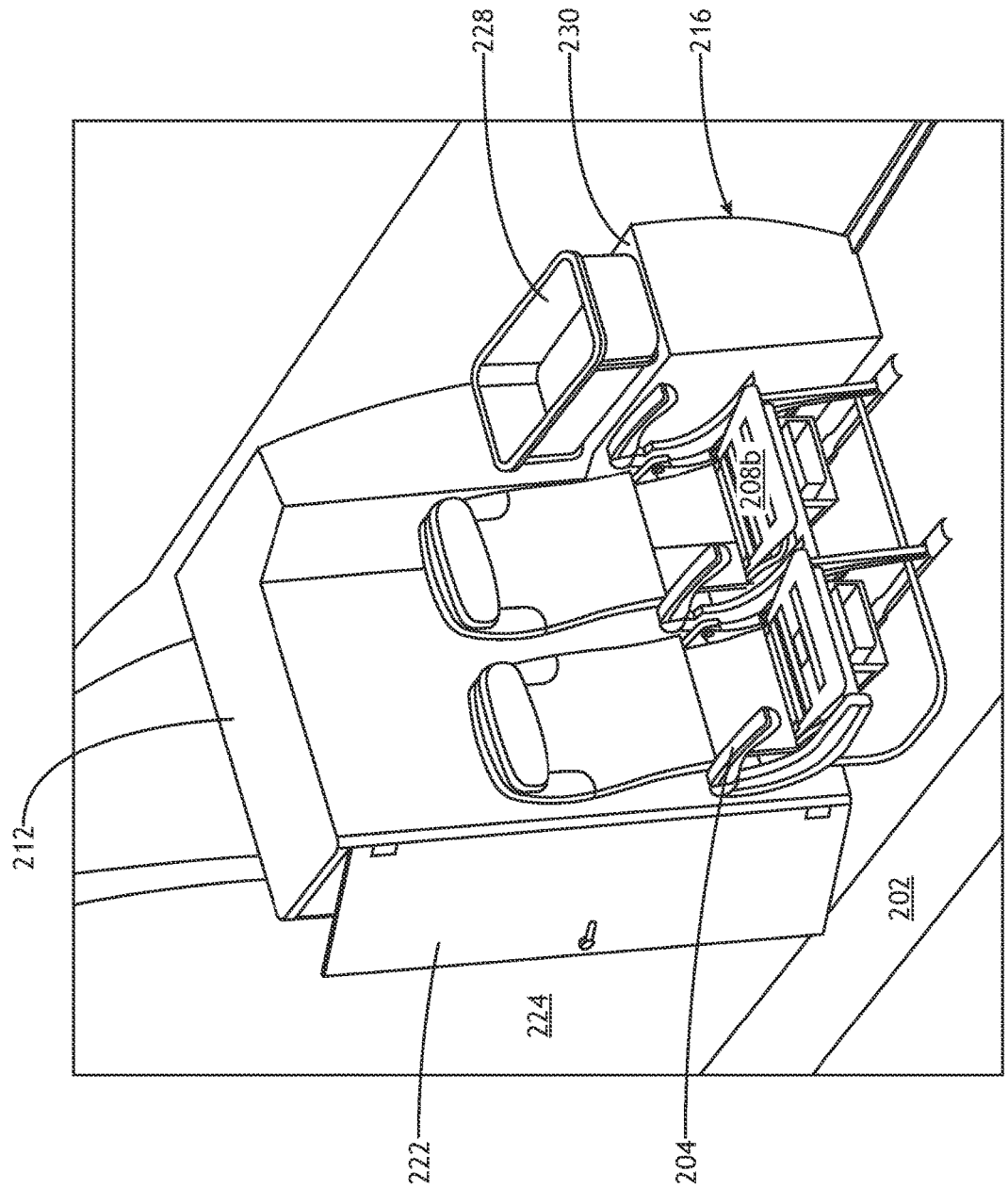
FIG. 5 is a front perspective view of a layout for a tapering rear section of an aircraft passenger cabin in accordance with at least one embodiment of the present disclosure, showing the closet accessible from a longitudinal aisle and a bassinet accessible from the seat row.

FIGS. 4 and 5 further illustrate the configuration of the closet 212 and position within the cabin layout 200 relative to each of the longitudinal aisle 202, transverse aisle 224, first seat row 204, etc. In some embodiments, the closet 212 is positioned spaced apart from the first seat row 204 to allow backrest recline. The first door 222 is shown configured to swing open into the transverse aisle 224, or into open space provided behind the closet 212, to provide access into the interior space from the first side of the closet 212. The second door 226 is shown configured to swing open into the longitudinal aisle 202 to provide access into the interior space from the third side of the closet 212.

In some embodiments the passenger accessory is a bassinet 228 positioned on an outboard side of the outboard seat 208b. In some embodiments, a passenger traveling with an infant may be seated in the outboard seat 208b and may make use of the bassinet 228 during flight. As best shown in FIG. 5, the second portion 216 of the closet 212 forms a horizontal support surface 230 positioned about armrest height of the outboard seat 208b. In some embodiments, the support surface is a usable tabletop. As shown, the support surface 230 may include provisions for mounting the bassinet 228. Mounting provisions may include, but are not limited to, brackets, fasteners, rails, etc. Although not shown, the top of the support surface 230 is may be positioned lower than a window so that the window is not obstructed.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed:

1. A closet configured to be positioned behind a seat row positioned alongside a tapering rear section of an aircraft passenger cabin formed between a tapering exterior wall and a longitudinal aisle, the closet comprising:
   a first portion configured to be positioned behind the seat row and extend from the tapering exterior wall to the longitudinal aisle; and
   a second portion, continuous with the first portion and tapering in a longitudinal direction, configured to extend longitudinally forward into a gap space formed between the tapering exterior wall and an outboard side of the seat row;

wherein:
the first portion and the second portion together form a continuous interior space;
each of the first portion and the second portion extend upward from floor level;
the continuous interior space is accessible from a rear facing side of the first portion of the closet; and
the second portion supports, on a top of the second portion, a passenger accessory positioned outside of the continuous interior space, the passenger accessory accessible from the seat row.

2. The closet according to claim 1, further comprising at least one of a first door for accessing the continuous interior space from the rear facing side of the first portion of the closet and a second door for accessing the continuous interior space from the longitudinal aisle.

3. The closet according to claim 1, wherein the continuous interior space is dimensioned to accommodate a wheelchair in a folded condition positioned along the tapering exterior wall.

4. The closet according to claim 1, wherein the first portion extends in height from floor to ceiling, and the second portion extends in height from floor level to armrest height of the seat row.

5. The closet according to claim 1, wherein a top of the second portion of the closet forms a substantially horizontal surface positioned along the outboard side of the seat row.

6. The closet according to claim 5, further comprising a bassinet mounted atop the horizontal surface.

7. The closet according to claim 1, wherein closet is generally L-shaped.

8. The closet according to claim 1, wherein the continuous interior space is not accessible from the seat row.

9. The closet according to claim 1, wherein the seat row includes one fewer seat than a further seat row positioned directly forward of the seat row.

10. The closet according to claim 1, wherein the seat row and a further seat row positioned directly forward of the seat row include the same number of seats.

11. A layout for a tapering rear section of an aircraft passenger cabin, comprising:
a longitudinal aisle;
a first seat row positioned between the longitudinal aisle and a tapering exterior wall of the aircraft passenger cabin;
a gap space formed between an outboard side of the first seat row and the tapering exterior wall; and
a closet comprising a first portion positioned behind a rear facing side of the first seat row and a second portion, continuous with the first portion, positioned in the gap space;
wherein:
the first portion and the second portion together form a continuous interior space;
the second portion tapers in a longitudinal direction and extends longitudinally forward relative to the first portion;
each of the first portion and the second portion extend upward from floor level;
the continuous interior space is accessible from a rear facing side of the first portion of the closet; and
the second portion supports, on a top of the second portion, a passenger accessory positioned outside of the interior space, the passenger accessory accessible from the first seat row.

12. The layout according to claim 11, further comprising a second seat row positioned between the longitudinal aisle and the tapering exterior wall, forward of the first seat row, and longitudinally adjacent to the first seat row, wherein the second seat row includes a greater number of seats as compared to the first seat row.

13. The layout according to claim 11, wherein the continuous interior space is dimensioned to accommodate a wheelchair in a folded condition positioned along the tapering exterior wall.

14. The layout according to claim 11, wherein the first portion extends in height from floor to ceiling, and the second portion extends in height from floor level to armrest height of the first seat row.

15. The layout according to claim 11, wherein a top of the second portion of the closet forms a substantially horizontal surface positioned along the outboard side of the first seat row.

16. The layout according to claim 15, further comprising a bassinet mounted atop the horizontal surface.

17. The layout according to claim 11, wherein the continuous interior space is further accessible from the longitudinal aisle.

* * * * *